(12) United States Patent
Son

(10) Patent No.: US 6,862,464 B1
(45) Date of Patent: Mar. 1, 2005

(54) POWER SUPPLY DEVICE FOR RADIO TELEPHONE SYSTEM

(75) Inventor: Chang Soo Son, Cheongju (KR)

(73) Assignee: LG Information & Communications, Ltd., Seoul (KR)

( * ) Notice: Subject to any disclaimer, the term of this patent is extended or adjusted under 35 U.S.C. 154(b) by 0 days.

(21) Appl. No.: 09/547,035

(22) Filed: Apr. 11, 2000

(30) Foreign Application Priority Data

Jun. 18, 1999 (KR) .......................................... 1999/10910

(51) Int. Cl.[7] .............................................. H04M 1/00
(52) U.S. Cl. ....................... 455/572; 455/462; 455/463; 455/573; 379/413; 379/428.02; 379/433.08
(58) Field of Search ................. 455/572, 573, 455/575, 550, 465, 74.1, 127, 343; 379/428.02, 322, 323, 324, 395.01, 9.05, 29.03, 29.04, 413, 433.01, 433.08; 307/2, 18, 22, 26, 46, 48, 49, 65, 66; 320/114, 115, 151, 152

(56) References Cited

U.S. PATENT DOCUMENTS

| 5,578,875 | A | * | 11/1996 | Dormer et al. ................ 307/66 |
| 5,596,626 | A | * | 1/1997 | Nakayama ................... 455/462 |
| 5,661,780 | A | * | 8/1997 | Yamamoto et al. ......... 455/573 |
| 5,805,998 | A | * | 9/1998 | Kodama ...................... 455/462 |
| 6,044,280 | A | * | 3/2000 | Muller ......................... 455/572 |
| 6,256,519 | B1 | * | 7/2001 | Newton ....................... 455/572 |

FOREIGN PATENT DOCUMENTS

WO    WO 99/31860    * 6/1999    ............ H04M/1/72

* cited by examiner

Primary Examiner—Temica M. Beamer
(74) Attorney, Agent, or Firm—Fleshner & Kim, LLP

(57) ABSTRACT

The present invention relates to a power supply device for a radio telephone system which can normally perform radio communication during power failure, by providing power of a battery disposed at a main body of the system or a wireless handset to the inside circuit of the main body, when direct current power is not supplied to the radio telephone system due to the power failure or the like.

14 Claims, 4 Drawing Sheets

POWER SUPPLY DEVICE FOR RADIO TELEPHONE SYSTEM

BACKGROUND OF THE INVENTION

1. Field of the Invention

The present invention relates to a radio telephone system, and in particular to a power supply device for a radio telephone system which can carry out radio communication during power failure by supplying a battery power of a wireless handset to a main body during the power failure.

2. Description of the Background Art

As illustrated in FIG. 1, a conventional wire telephone system includes: a telephone call detector 10 detecting a phone call from the other party; a power switching unit 20 switching power supplied from a central office through a local loop (a) to the inside of the system; and a voice communication unit 30 receiving the power through the power switching unit 20, and performing the telephone communication.

The telephone call detector 10 includes: a ring signal detector 11 detecting a ring signal from an electric signal transmitted through a public switched telephone network (PSTN) 1; and a speaker 12 generating a certain sound according to the output from the ring signal detector 11.

The power switching unit 20 includes: a hook switch 21 hooked off when the user holds a handset; a bridge diode 22 rectifying the power inputted through the local loop (a); and a loop switch 23 turned on when the hook switch 21 is hooked off, for switching the power rectified in the bridge diode 22 to the voice communication unit 30.

The voice communication unit 30 includes: a voice signal processing unit 31 converting the electric signal transmitted through the PSTN 1 into a voice electric signal; a wire handset 32 converting the voice electric signal outputted from the voice signal processing unit 31 into a voice signal; a keypad 33 inputting a telephone number of the other party; and a dialer 34 transmitting an electric signal corresponding to the telephone number inputted from the keypad 33.

The operation of the conventional wire telephone system will now be described in detail with reference to FIG. 1.

In general, a plurality of wire telephone systems are connected to the PSTN. Each of the plurality of wire telephone systems is provided with the power required for the telephone communication from the central office (not shown) through the local loop.

Accordingly, in the wire telephone system as shown in FIG. 1, when the user hooks off the wire handset 32 from the hook switch 21 for the telephone communication, a power switch SW2 is turned on. As a result, the power inputted through the local loop (a) and rectified in the bridge diode 22 is supplied to the voice communication unit 30 through the loop switch 23, and therefore the voice communication unit 30 performs the telephone communication by utilizing the inputted power.

That is, when the ring signal is inputted through the PSTN 1, the ring signal detector 11 of the telephone call detector 10 detects the ring signal from the electric signal, and outputs it to the speaker 12. Accordingly, the user recognizes by a bell that he has a telephone call.

Thereafter, when the user hooks off the wire handset 32 so as to answer the telephone call, the power is supplied to the voice communication unit 31 through the loop switch 23. Thus, the electric signal transmitted through the PSTN 1 is converted into the voice electric signal in the voice signal processing unit 31, and outputted to the wire handset 32. Accordingly, the user can perform the voice communication with the other party through the wire handset 32.

In addition, in the case that the user hooks off the wire handset 32 in order to make a telephone call, the power is also supplied to the voice communication unit 31 through the power switch 23. When the user inputs a telephone number of the other party through the keypad 33, the inputted telephone number is converted into an electric signal in the dialer 34, and outputted to the PSTN 1 through the local loop (a).

Accordingly, when the other party hooks off the wire handset, the user performs the voice communication through the wire handset 32. Here, the wire handset 32 converts the voice signal of the user into the voice electric signal, and the voice signal processing unit 31 converts the voice electric signal outputted from the wire handset 32 into the electric signal, and outputs it to the PSTN 1.

As discussed earlier, the conventional wire telephone system performs the voice communication by using the power supplied from the central office. Even if the power failure is generated in a place where the wire telephone is located, since the wire telephone system is normally operated, the wanted telephone communication can be always performed.

On the other hand, as the radio communication techniques have been developed, the radio telephone system using the wireless handset instead of the wire handset has been widely distributed and used in the PSTN. The radio telephone system includes: a main body which is a subscriber terminal of the PSTN; and a wireless handset performing the radio communication with the main body. If necessary, the wireless handset is provided in a multiple number.

Accordingly, the user carries out the low output and high frequency radio communication with the main body of the radio telephone system by employing the wireless handset. The main body performs the communication by connecting a signal transmitted from the wireless handset to the PSTN.

However, the radio telephone system requires a specific power in order to perform the communication between the wireless handset and the main body. Accordingly, in the conventional radio telephone system, in case the power is not supplied to the main body due to the power failure or the like, the communication between the main body and the wireless handset is impossible, and thus the radio communication cannot be carried out.

SUMMARY OF THE INVENTION

Accordingly, it is a primary object of the present invention to provide a power supply device for a radio telephone system which can carry out radio communication by supplying a battery power of a handset to a main body of the system during power failure.

It is another object of the present invention to provide a power supply device for a radio telephone system which can perform radio communication, by providing a special battery to a main body of the system, and supplying the battery power to the main body during power failure.

In order to achieve the above-described objects of the present invention, in a radio telephone system consisting of a system main body and a wireless handset disposed at the system main body, a power supply device for the radio telephone system, includes: a power failure detector detecting power failure according to a direct current power state; a power switching unit switching battery power of a wireless handset to the inside circuit of the main body during the power failure according to the output signal from the power failure detector; and a battery power intercepting unit intercepting the battery power of the wireless handset to be supplied to the inside circuit of the wireless handset during the power failure according to the output signal from the power failure detector.

In addition, in order to achieve the above-described objects of the present invention, there is provided a power supply device for a radio telephone system, including: a battery disposed at a main body of the radio telephone system; a charging power supply unit outputting a charging voltage of the system main body from direct current power; a main body voltage supply unit outputting operational power of the system main body from the direct current power; a power failure detector detecting power failure according to the direct current power state; and a switch supplying the battery power to an inside circuit of the main body according to the output from the power failure detector.

BRIEF DESCRIPTION OF THE DRAWINGS

The present invention will become better understood with reference to the accompanying drawings which are given only by way of illustration and thus are not limitative of the present invention, wherein.

DETAILED DESCRIPTION OF THE PREFERRED EMBODIMENTS

A power supply device for a radio telephone system in accordance with a preferred embodiment of the present invention will now be described with reference to the accompanying drawings.

Figure 1:
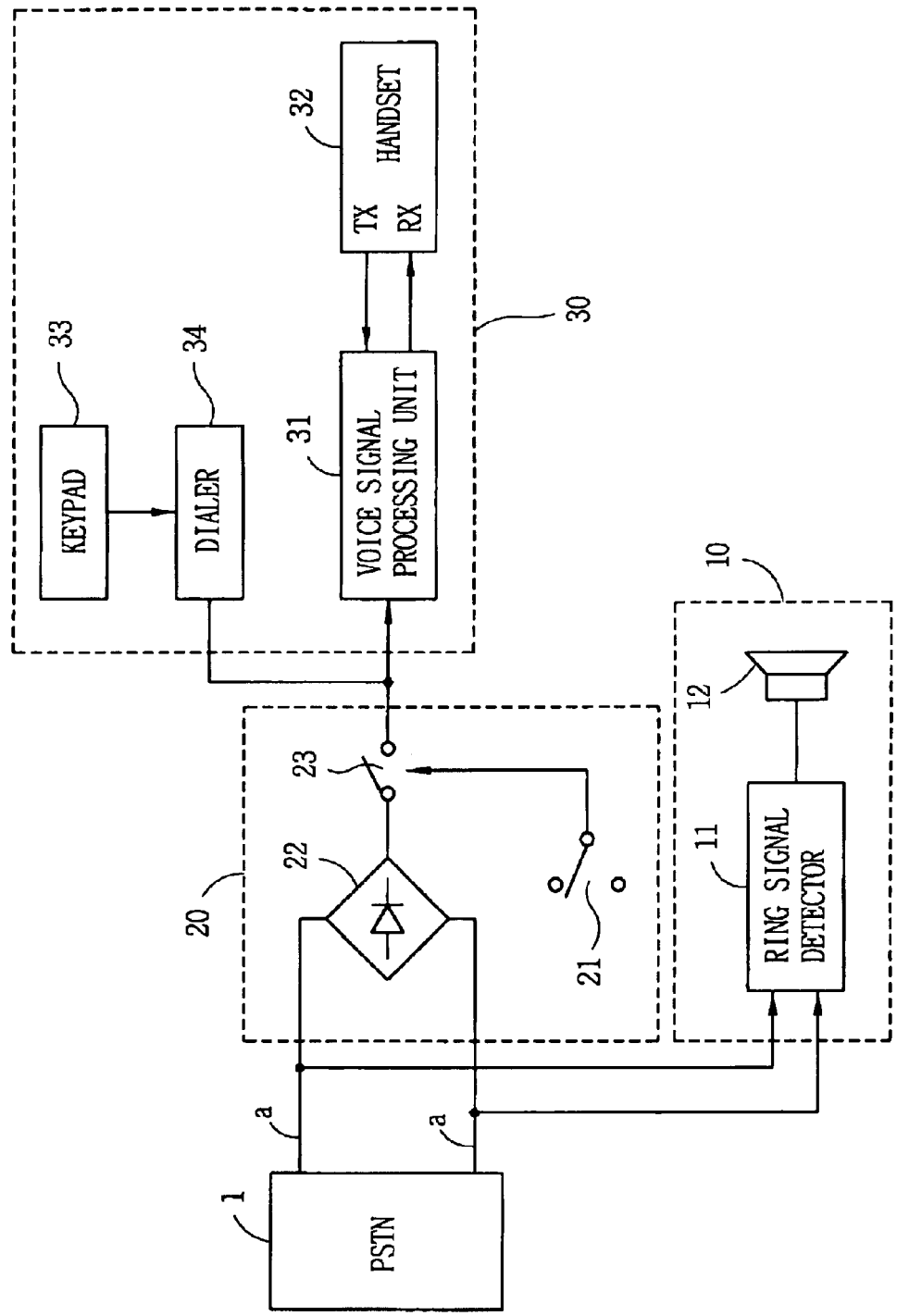
FIG. 1 is a block diagram illustrating a conventional wire telephone system.
Figure 2:
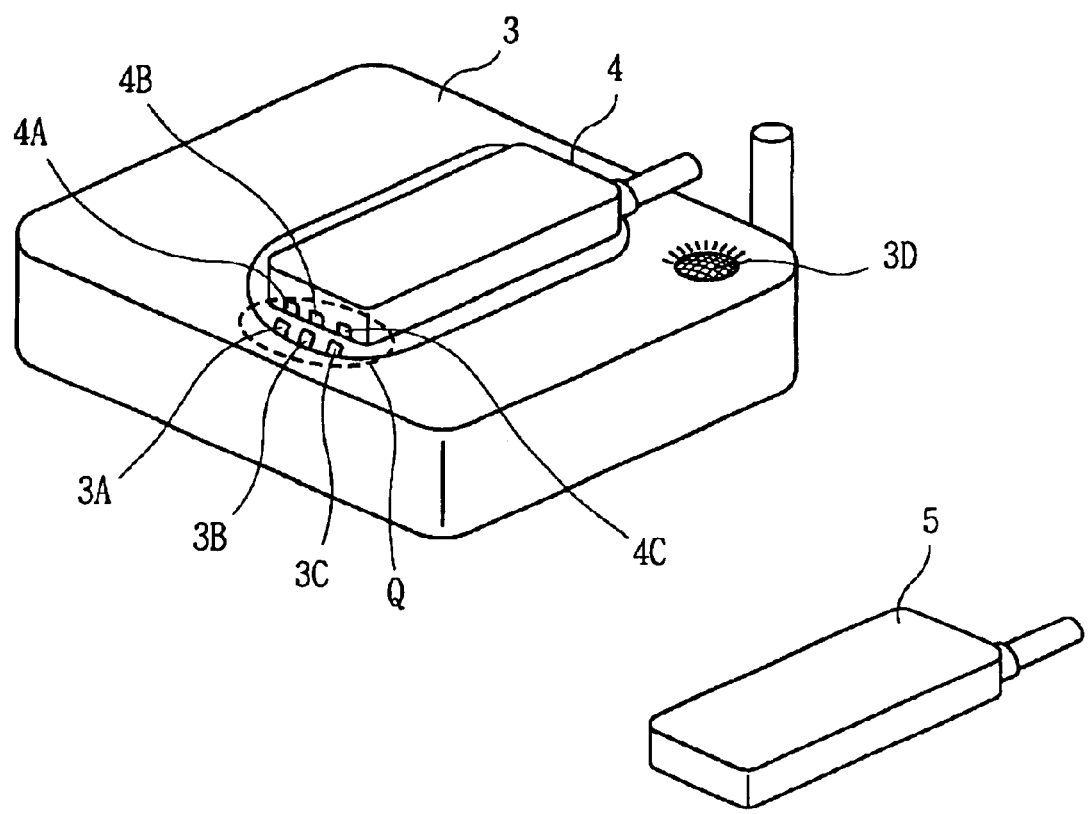
FIG. 2 is a perspective diagram illustrating a radio telephone system in accordance with the present invention.

FIG. 2 is a perspective diagram illustrating the radio telephone system in accordance with the present invention.

As shown therein, the radio telephone system includes: a system main body 3, and first and second wireless handsets 4, 5. Terminals 3A, 3B, 3C of the main body 3 are connected to terminals 4A, 4B, 4C of the first wireless handset 4 through a connection unit Q, respectively. Accordingly, when the power failure occurs, the battery power of the first wireless handset 4 is supplied to the main body 3 through the connection unit Q, the communication is performed by using the second wireless handset 5, and an LED 3D of the main body 3 indicates that the power failure is generated.

Figure 3:
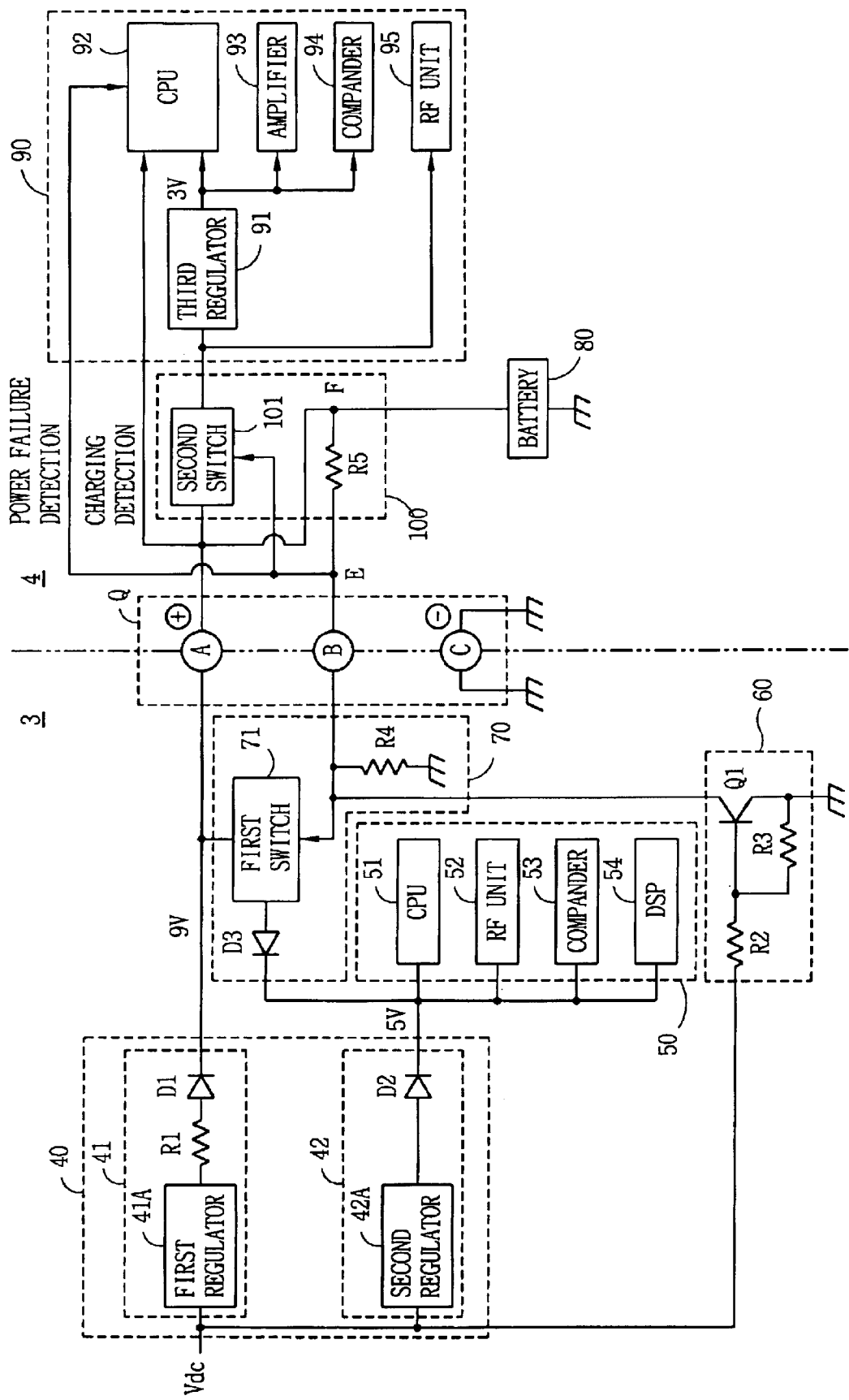
FIG. 3 is a detailed structure diagram illustrating a power supply device for a radio telephone system in accordance with a preferred embodiment of the present invention.

FIG. 3 illustrates the power supply device for the radio telephone system in accordance with the present invention.

As shown therein, the power supply device for the radio telephone system includes: a power supply unit 40 receiving a direct current power Vdc, and supplying an operational power (5V) of the system body 3 and a charging power (9V) charging the wireless handset 4; a main body inside circuit 50 performing various signal processing operations required for the operation of the system main body 3; a power failure detector 60 detecting power failure; a power switching unit 70 switching battery power of the wireless handset 4 to the inside circuit 50 of the system main body 3 during the power failure; a battery 80 of the wireless handset 4; an inside circuit 90 of the wireless handset 4 performing various signal processing operations required for the operation of the wireless handset 4; and a power intercepting unit 100 intercepting the battery power of the wireless handset 4 to be supplied to the inside circuit 90 of the wireless handset 4 during the power failure.

The power supply unit 40 includes: a charging power supply unit 41 receiving the direct current power Vdc, and outputting the power of 9V in order to charge the battery 80 of the wireless handset 4; and a main body power supply unit 42 receiving the direct current power Vdc, and outputting the power of 5V required for the operation of the main body inside circuit 50.

The charging power supply unit 41 includes: a first regulator 41A adjusting the direct current power Vdc, and outputting the power of 9V; and a resistance R1 and a diode D1 connected in series to an output terminal of the first regulator 41A. The main body power supply unit 42 includes: a second regulator 42A adjusting the direct current power Vdc, and outputting the power of 5V; and a resistance R2 and a diode D2 connected in series to an output terminal of the second regulator 42A.

The main body inside circuit 50 includes: a CPU 51 operated by the power of 5V outputted from the main body power supply unit 42, for performing various operations required for the radio communication; a radio frequency unit RF; a compander 53; and a digital signal processing unit DSP 54. Here, the operation of each unit is identical to the conventional art, and an explanation thereof will be omitted.

The power failure detector 60 includes a bipolar transistor Q1 connected between the power switching unit 70 and the ground, and having its base connected to receive the direct current power Vdc. In addition, the bipolar transistor Q1 may be replaced by a field effect transistor FET.

The power switching unit 70 includes: a first switch 71 switching the power of the battery 80 to the main body inside circuit 50 according to the output from the power failure detector 60; and a diode D3 connected in a forward direction to an output terminal of the first switch 71. Here, a resistance R4 is a load resistance.

The wireless handset inside circuit 90 includes: a third regulator 91 adjusting the power of 9V outputted from the charging power supply unit 41 to the power of 3V; a CPU 92 performing various operations required for the radio communication according to the power of 3V outputted from the third regulator 91; an amplifier 93; a compander 94 and a radio frequency RF unit 95. Here, the operation of the respective units is identical to the conventional art, and thus an explanation thereof will be omitted.

The power intercepting unit 100 includes a second switch 101 switching the power of 9V outputted from the charging power supply unit 41 to the inside circuit 90 of the wireless handset 4 during the normal operation, and preventing the power of the battery 80 from being applied to the other constitutional elements 91, 93, 94, 95 of the inside circuit 90, except for the CPU 92 during the power failure.

The operation of the power supply device for the radio telephone system in accordance with the present invention will now be described with reference to the accompanying drawings.

① When the direct current power Vdc is normally inputted.

When the power failure does not take place, namely when the direct current is normally inputted, the transistor Q1 of the power failure detector 60 is turned on. Thus, the first switch 71 is turned off and the second switch 101 is turned on according to the low-level output signal outputted form the power failure detector 60. Here, the charging power supply unit 42 of the power supply unit 40 outputs the power of 9V in order to charge the battery 80 of the wireless handset 4, and the main body power supply unit 42 outputs the power of 5V required for the operation of the main body inside circuit 50.

Accordingly, the power of 9V outputted from the charging power supply unit 41 is supplied to the battery 80 of the wireless handset 4, and inputted to the inside circuit 90 through the second switch 101. The CPU 92 of the wireless handset 4 recognizes charging from a voltage of a contact point F, thereby starting a charging operation of the battery 80. The power of 5V outputted from the main body power supply unit 42 is directly supplied to the main body inside circuit 50, thereby operating the CPU 51, the RF unit 52, the compander and the DSP 54. At this time, the diode D3 prevents the power of 5V outputted from the main body power supply unit 42 from being applied to the first switch 71.

Accordingly, as depicted in FIG. 3, the first wireless handset 4 performs the charging operation, connected to the main body 3, and the second wireless handset 5 performs the radio communication far from the main body 3.

However, the power failure may be generated in a place where the radio telephone system is located, or the direct current power Vdc may not be supplied to the radio telephone system.

② When the direct current power Vdc is not supplied.

When the direct current power Vdc is not supplied due to the power failure or the like, the power supply unit 40 and the inside circuit 50 of the main body 3 are not operated, and the transistor Q1 of the power failure detector 60 is turned off.

The CPU 92 of the wireless handset 4 recognizes the power failure from a voltage of a contact point E, thereby stopping the charging operation of the battery 80. The first switch 71 is turned on and the second switch 101 is turned off by the power of the battery 80. As a result, the power of the battery 80 is inputted to the main body inside circuit 50 through the first switch 71, thereby operating the constitutional elements 51–54 of the main body inside circuit 50. Here, the diode D2 prevents the power of the battery 80 from being applied to the main body power supply unit 42, and the diode D3 prevents the power of the battery 80 from being applied to the constitutional elements 91, 93, 94, 95, except for the CPU 92.

Accordingly, the power of the battery 80 of the first wireless handset 4 is supplied to the inside circuit 50 of the system body 3 during the power failure, and thus the system main body can perform the radio communication with the second wireless handset 5, as shown in FIG. 3.

Figure 4:
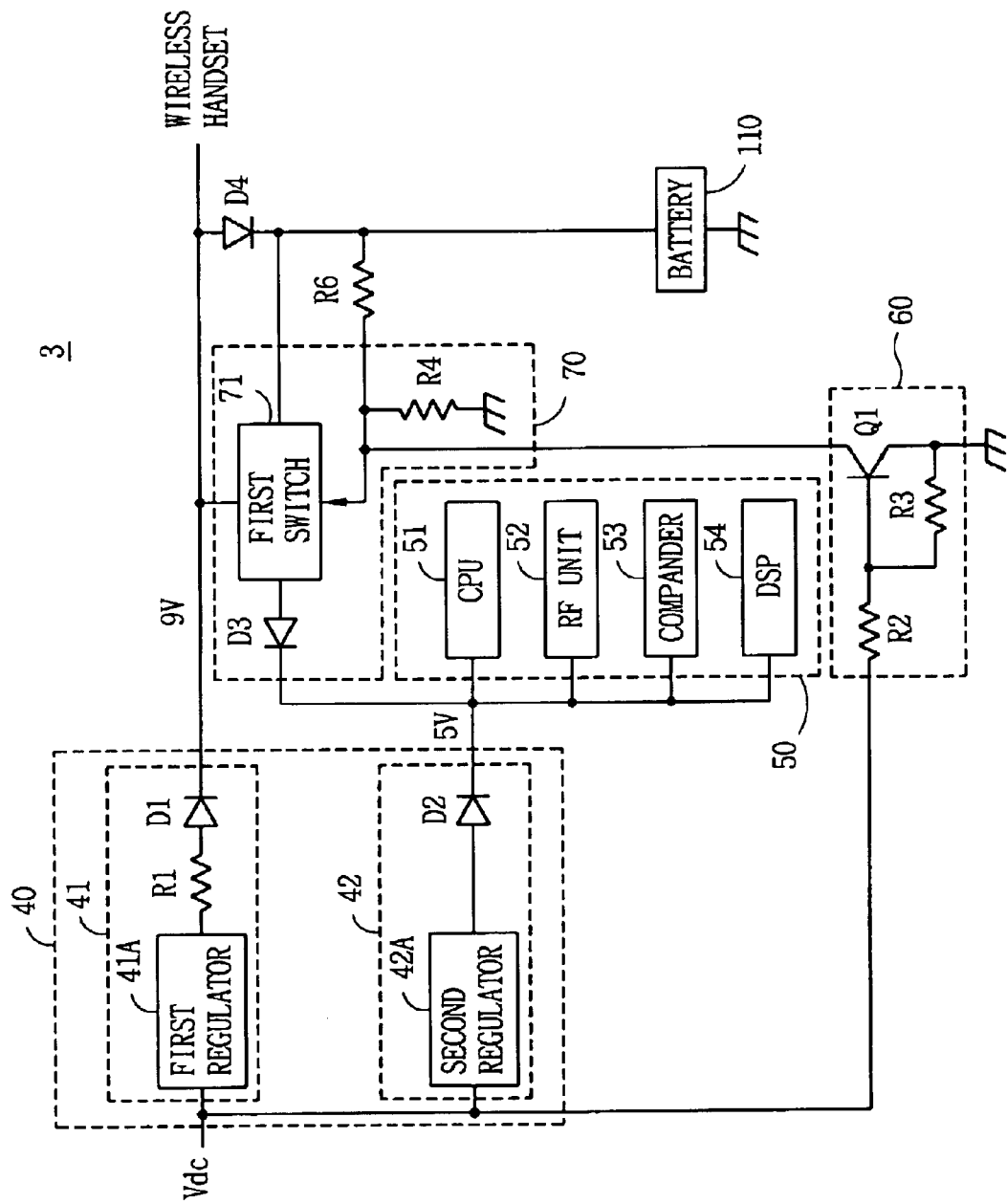
FIG. 4 is a detailed structure diagram illustrating a power supply device for a radio telephone system in accordance with another embodiment of the present invention.

FIG. 4 illustrates a power supply device for a radio telephone system in accordance with another embodiment of the present invention. A battery 110 is disposed at the system main body 3, and thus the power of the battery 110 can be inputted to the main body inside circuit 50 through the first switch 71 during the power failure. Here, the diode D4 prevents the power of the battery 110 from being inputted to the wireless handset 4.

As discussed earlier, in accordance with the present invention, in the case that the direct current power is not supplied to the radio telephone system due to the power failure or the like, the power of the battery disposed at the system main body or wireless handset is directly supplied to the inside circuit of the main body, thereby normally carrying out the radio communication during the power failure.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the meets and bounds of the claims, or equivalences of such meets and bounds are therefore intended to be embraced by the appended claims.

What is claimed is:

1. A communications system, comprising:
a first wireless communication terminal;
a second wireless communication terminal;
a base station including:
(a) a detector which detects failure of power to the base station, including a bipolar transistor or a field effect transistor FET connected between a power switching unit and ground and having a base or gate connected to receive direct current power,
(b) the power switching unit including:
a first switch switching power of the first terminal to the base station according to an output from the detector,
a first diode connected in a forward direction to an output terminal of the first switch;
a second diode preventing power of a charging power supply unit from being applied to a power supply unit of the base station; and
a third diode preventing the power of the charging power supply unit from being applied to the first terminal except for a main processor of the first terminal,
(c) a power intercepting unit, including:
a second switch switching the power output from the charging power supply unit to the first terminal during normal operation, wherein if the main processor recognizes the power failure, the first switch is turned on and the second switch is turned off by the power from the charging power supply unit, and
(d) a processor which manages communications between the second terminal and the base station while the base station receives power from the charging power supply unit.

2. The system of claim 1, wherein a power supply of the first terminal includes a battery.

3. The system of claim 1, wherein the base station includes:
an indicator which activates when the detector detects said power failure.

4. The system of claim 3, wherein the indicator includes an LED.

5. A communications system, comprising:
a first wireless communication terminal;
a second wireless communication terminal; and
a base station including:
(a) a power switching unit;
(b) a detector which detects a failure of power to the base station, said detector including a bipolar transistor or a field effect transistor FET connected between the power switching unit and a reference potential and having a base or gate connected to receive direct current power, and (c) a processor which manages communications between the second terminal and the base station while the base station receives power from the first terminal, wherein the power switching unit includes:

(1) a first switch which switches power from a power supply of the first terminal to an internal circuit of the base station according to an output from the detector; and (2) a first diode coupled between an output terminal of the first switch and the internal circuit of the base station, wherein the base station further includes a second diode preventing power from the power supply of the first terminal from being applied to a power supply unit of the base station, wherein the first terminal includes a power intercepting unit having a second switch which switches power from the power supply unit of the base station to an internal circuit of the first terminal during normal operation, and wherein when a main processor of the first terminal recognizes the power failure to the base station, the first switch is turned on and the second switch is turned off by power from the power supply of the first terminal.

6. The system of claim 5, wherein, during normal operation, charging power from the power supply unit of the base station is applied to the power supply of the first terminal through the power intercepting unit.

7. The system of claim 5, wherein the first diode prevents power from the power supply of the first terminal from being applied to an internal circuit of the first terminal except for the main processor of the first terminal.

8. The system of claim 5, wherein the first switch switches power from the power supply of the first terminal to the internal circuit of the base station through the first diode when the power failure is detected by the detector.

9. The system of claim 5, wherein the power supply unit includes:

a first power supply unit which powers the internal circuit of the base station when no power failure is detected; and a second power supply unit which charges the power supply of the first terminal through the power intercepting unit when no power failure is detected.

10. The system of claim 9, wherein the second diode prevents power from the power supply of the first terminal from being applied to the first power supply unit of the base station.

11. The system of claim 9, wherein the base station further includes:

a third diode which prevents power from being applied to the second power supply unit from the power supply of the first terminal or from another source.

12. The system of claim 5, wherein the base station includes:

a battery; and a third diode which prevents power from the battery from being applied to the first terminal when the power failure is detected.

13. The system of claim 5, wherein when the main processor of first terminal recognizes the power failure to the base station, turning on the first switch and turning off the second switch transfers power from the power supply of the first terminal to the internal circuit of the base station along a signal path which passes through the first switch and first diode.

14. The system of claim 5, wherein the base station includes an indicator which activates when the detector detects the power failure.

* * * * *